(12) United States Patent
Kuo et al.

(10) Patent No.: US 7,028,320 B2
(45) Date of Patent: Apr. 11, 2006

(54) METHOD FOR REDUCING THE ROTATION SPEED OF AN AUTOMATIC BALL BALANCING SYSTEM OF AN OPTICAL DISK READING DEVICE

(75) Inventors: Lih-Hwa Kuo, Hsinchu (TW); Jeng-Jiun Chen, Taoyuan (TW)

(73) Assignee: Lite-On It Corp., (TW)

( * ) Notice: Subject to any disclaimer, the term of this patent is extended or adjusted under 35 U.S.C. 154(b) by 150 days.

(21) Appl. No.: 10/412,527

(22) Filed: Apr. 11, 2003

(65) Prior Publication Data

US 2004/0001422 A1    Jan. 1, 2004

(30) Foreign Application Priority Data

Jun. 28, 2002    (TW) ............................... 91114269 A

(51) Int. Cl.
*G11B 17/028* (2006.01)
(52) U.S. Cl. ..................................... 720/702
(58) Field of Classification Search ................. 720/702
See application file for complete search history.

(56) References Cited

U.S. PATENT DOCUMENTS 6,155,134 A * 12/2000 Ikuta et al. ................ 74/573 R
6,333,912 B1 * 12/2001 Sohn .......................... 720/702
6,348,747 B1 * 2/2002 Liao et al. ..................... 310/51

* cited by examiner

*Primary Examiner*—David Davis
(74) *Attorney, Agent, or Firm*—Raymond Sun

(57) ABSTRACT

A method for reducing the stable rotation speed of an automatic ball balancing system is used with an automatic ball balancing system that has a rotor that has an annular track, with at least one ball provided for rotation inside the track. First, an optimum rotation speed $w_s$ that is between the unstable critical rotation speed $w_c$ of a ball and a working rotation speed $w$ is first determined. In the next step, the rotor is accelerated to the optimum rotation speed $w_s$. Next, the acceleration of the rotor is reduced until the balls are stationary relative to the track, and then the rotor is accelerated to the working rotation speed $w$.

7 Claims, 5 Drawing Sheets

METHOD FOR REDUCING THE ROTATION SPEED OF AN AUTOMATIC BALL BALANCING SYSTEM OF AN OPTICAL DISK READING DEVICE

BACKGROUND OF THE INVENTION

1. Field of the Invention

The present invention relates to an optical disk reading device, and in particular, to a control method for reducing the stable rotation speed of an automatic ball balancing system. In particular, the present invention pertains to a method that is applied to the rotor mechanism of an optical disk reading device to reduce the amount of vibration before the rotor mechanism reaches the working rotation speed, so as to effectively improve the service life of the bearing of the rotor.

2. Description of the Prior Art

General optical disk reading devices, such as CD-ROM, DVD-ROM, CD-RW, DVD-RAM, and other optical data reproducing or recording devices, have been widely used in multimedia computer systems and have become an important component among the peripheral devices of computer systems.

The data reading or storing speed of a conventional optical disk drive is expressed as multiplication speed (i.e., 1 multiplication speed=150 kbyte/sec). The magnitude of the multiplication speed is directly related to the spindle motor that drives the optical disk inside the optical disk drive. The faster the spindle motor rotates, the higher the multiplication speed for the reading or storing operation in the optical disk. However, when the spindle motor rotates at high speeds, the centrifugal deviation force generated by unbalance of the optical disk is also increased, which will lead to vibration, noise, and other problems. Also, excessive vibration will lead to an out-of-focus optical reading head and other unstable situations. Consequently, in order to effectively suppress vibration to ensure that the data stored in the optical disk can be read correctly by the optical disk drive, optical disk drive manufacturers have developed a type of automatic ball balancing system that functions to reduce vibration. As described in greater detail below, the automatic ball balancing system has a track on which one or more balls are disposed for movement.

The theory for the balls of the above-mentioned automatic ball balancing system to reach the desired balanced positions is based on the theory of rotor dynamics. FIGS. 1A–1C illustrate three possible conditions for the balls 2 in the automatic ball balancing system. First, when the stable rotation speed of the spindle motor is lower than the unstable critical rotation speed (called natural frequency of the suspending system), the unbalance amount of the balls 2 and the imbalance center of mass of the disk 10 of the system are in the same phase state (as shown in FIG. 1A). Second, when the stable rotation speed of the spindle motor is equal to the unstable critical rotation speed, there is a phase difference of 90° between the unbalance amount of the balls 2 and the imbalance center of mass of the disk 10 of the system (as shown in FIG. 1B). The numeral 20 in FIG. 1B illustrates the position of the balls 2 during this condition. Third, when the stable rotation speed of the spindle motor is higher than the unstable critical rotation speed, there is a phase difference of 180° between the unbalance amount of the balls 2 and the imbalance center of mass of the disk 10 of the system (as shown in FIG. 1C). Again, the numeral 20 in FIG. 1C illustrates the position of the balls 2 during this condition.

Here, the unstable critical rotation speed $w_c$ is the rotation speed at which the balls 2 are stable. As shown in FIG. 2, when the spindle motor rotates under a uniform acceleration (that is, the initial acceleration of $\alpha_1$) and the speed increases above the unstable critical rotation speed $w_c$, the center of mass of the balls 2 moves to the position with the lowest potential energy. When the spindle motor reaches a stable rotation speed $w_s$, reducing the acceleration of the motor can stabilize the balls 2 within the shortest period of time. After the balls 2 are stabilized, the balls 2 will have no relative movement with respect to the track. At that time, the spindle motor can be accelerated again to working rotation speed w. Consequently, when the spindle motor reaches the stable rotation speed $w_s$, the rotor mechanism of the optical disk drive can be balanced automatically.

In the application of the automatic ball balancing system to the rotor mechanism, if the spindle motor is operated under a uniform acceleration to reach the working rotation speed w directly, it is still possible to reduce the unbalance amount of the rotor. However, under this condition, the rotation speed of the motor will be very high when the balls 2 are balanced. This will eventually result in the rotor being accelerated slowly and the force exerted on the rotation shaft being increased, thereby reducing the service life of the rotation shaft and the bearing.

Thus, there still remains a need to reduce the vibration in the automatic ball balancing system of an optical disk drive before the rotor mechanism reaches the working rotation speed so as to effectively improve the service life of the rotation shaft and the bearing.

SUMMARY OF THE DISCLOSURE

It is an object of the present invention to provide a control method for reducing the stable rotation speed of an automatic ball balancing system.

It is another objective of the present invention to reduce the stable rotation speed of the automatic ball balancing system to reduce the vibration before the spindle motor reaches the working rotation speed so as to effectively improve the service life of the balls.

In order to accomplish the objects of the present invention, the present invention provides a control method for reducing the stable rotation speed of an automatic ball balancing system. The automatic ball balancing system has a rotor that has an annular track, with at least one ball provided for rotation inside the track. According to the method of the present invention, an optimum rotation speed $w_s$ that is between the unstable critical rotation speed $w_c$ of a ball and a working rotation speed w is first determined. In the next step, the rotor is accelerated to the optimum rotation speed $w_s$. Next, the acceleration of the rotor is reduced until the balls are stationary relative to the track, and then the rotor is accelerated to the working rotation speed w.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with a pull-in type of compact disk player, the present invention can be applied to all optical disk reading devices, including but not limited to CD drives, DVD drives, CD/DVD drives, DVD/RW combo drives, car audio drives, etc.

Figure 3:
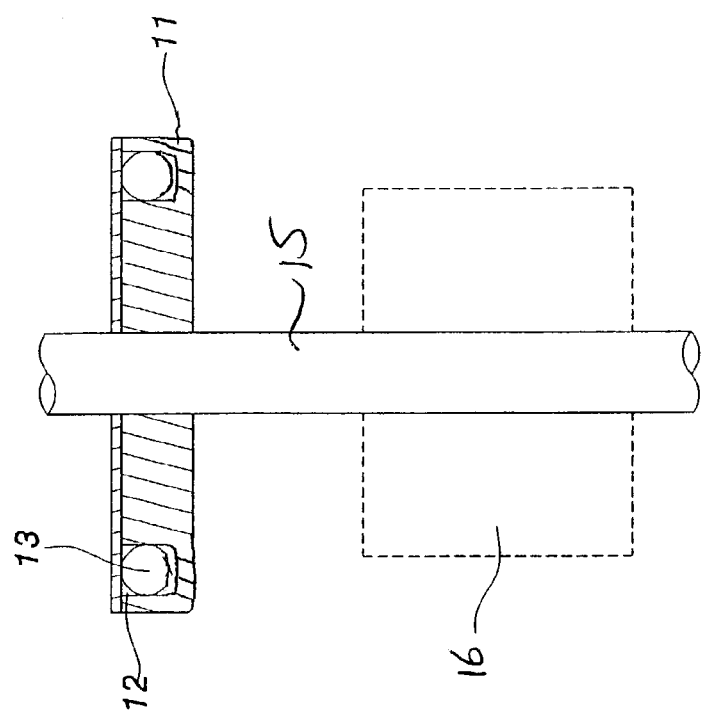
FIG. 3 illustrates an automatic ball balancing system for use with an optical disk reading device of the present invention.

The present invention pertains to a control method for reducing the stable rotation speed $w_s$ of an automatic ball balancing system. FIG. 3 illustrates an automatic ball balancing system according to the present invention, which is applied to the rotor mechanism installed in the optical disk drive to provide rotating movement. The rotor mechanism includes a spindle motor 16 and a rotor 11 driven by the spindle motor 16. The rotor 11 is connected to the rotation shaft 15 that is carried by the spindle motor 16. The automatic ball balancing system is shown as being installed above the spindle motor 16, although it is also possible to install the automatic ball balancing system below the spindle motor 16. The rotor 11 is shaped like a plate with at least one concentric annular track 12 facing upwardly. The track 12 is formed at the top of the rotor 11, and at least one ball 13 is placed on the track 12. The balls 13 can move freely along the track 12. When the optical disk drive is operated, the spindle motor 16 drives an optical disk (not shown in FIG. 3 but is above the rotor 11) to rotate via the rotor 11. During the rotation movement, the balls 13 on the track 12 are pressed against the outer side wall of the track 12 under centrifugal force. When the rotation speed of the rotor 11 is between the natural frequency $w_n$ and the unstable critical rotation speed $w_c$, the system phase angle of the balls 13 will fluctuate in a stable interval, and the overall vibration of the system will decrease significantly. As a result, the balls 13 will move to the balanced positions.

Figure 4:
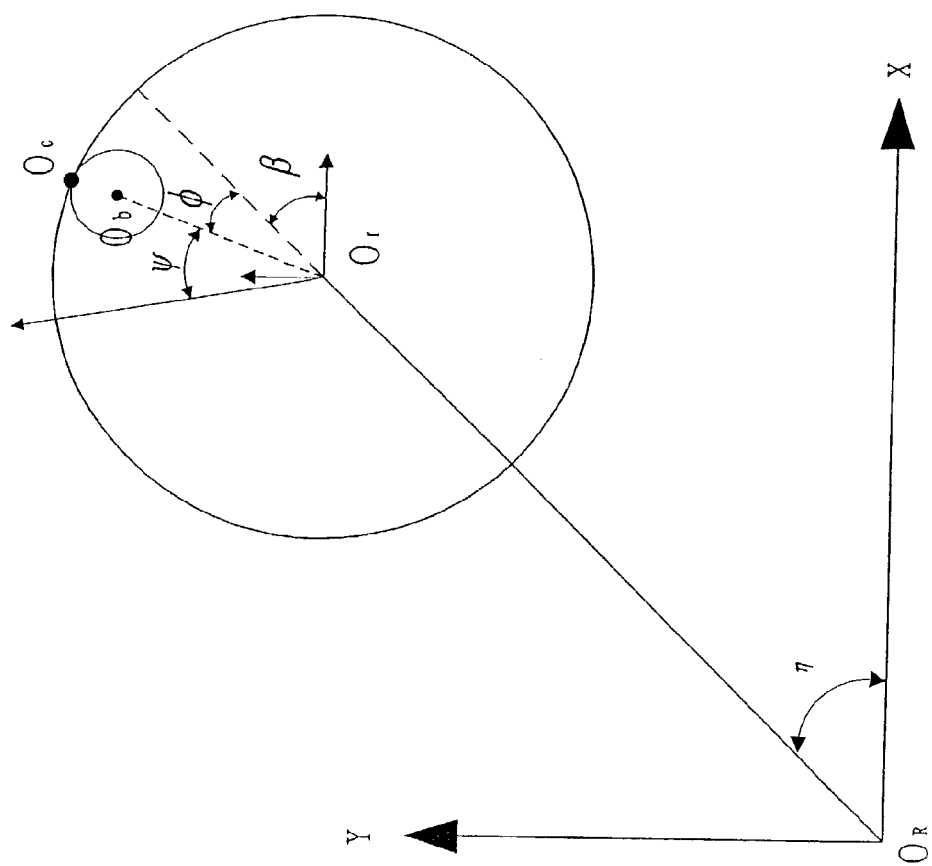
FIG. 4 shows the theoretical model of the automatic ball balancing system according to the present invention.

FIG. 4 shows the theoretical model of the automatic ball balancing system according to the present invention. The following equations of motion can be derived from this theoretical model.

$$M\ddot{X}+C\dot{X}+KX=M_re(\ddot{\beta}\sin\beta+\dot{\beta}^2\cos\beta)+mR\lfloor(\ddot{\beta}+\ddot{\phi})\sin(\beta+\phi)+(\dot{\beta}+\dot{\phi})^2\cos(\beta+\phi)\rfloor$$

$$M\ddot{X}+C\dot{X}+KX=M_re(\ddot{\beta}\cos\beta\beta+\dot{\beta}^2\sin\beta)+mR\lfloor(\ddot{\beta}+\ddot{\phi})\cos(\beta+\phi)+(\dot{\beta}+\dot{\phi})^2\sin(\beta+\phi)\rfloor$$

$$\ddot{X}\sin(\beta+\phi)-\ddot{Y}\cos(\beta+\phi)-R\ddot{\phi}=R\ddot{\beta}\pm\mu(R\dot{\phi}^2+2R\dot{\phi}\dot{\beta}-r\dot{\beta}^2)$$

where, $\mu$ is the movement resistance of the ball.

The aforementioned equations of motion are converted into the polar coordinate form. Also, it is assumed that the angle of the ball with respect to the unbalance amount is $\pi$ when the ball reaches the stable state, that is, $\phi=\pi$. When this is substituted into the aforementioned equations under the aforementioned assumption, the following can be obtained:

$$\left(\mu+\frac{(M_r\cdot e-m\cdot R)}{M\cdot r}\sin\psi\cos\psi\right)\left(\frac{\dot{\beta}}{\omega_n}\right)^2 = \left(\frac{R}{r}+\frac{(m\cdot R-M_r\cdot e)}{M\cdot r}\sin^2\psi\right)\left(\frac{\ddot{\beta}}{\omega_n^2}\right)+\frac{2\cdot\dot{X}\cdot\xi}{r\cdot\omega_n}\sin\psi+\frac{X}{r}\sin\psi$$

Equation (1)

where, $0\leq\psi\leq\pi$, and $\ddot{\beta}$ is the rotating acceleration and $\dot{\beta}$ is the rotation speed, $$\omega_n = \sqrt{\frac{K}{M}}$$

$$\xi = \frac{C}{2M\omega_n}$$

It is also possible to derive the condition for movement of the balls 13 at a constant rotation speed with respect to the track 12.

$$\frac{\ddot{X}}{\dot{\beta}^2} > \frac{\mu\cdot r}{\sin\phi}$$

Equation (2)

If it is given that $$G(\dot{\beta}) = \frac{M\cdot\ddot{X}}{M_r\cdot e\cdot\dot{\beta}^2}$$

is the frequency response of the system, Equation (2) can be converted into the following:

$$\frac{G(\dot{\beta})}{M}\cdot M_r\cdot e > \frac{\mu\cdot r}{\sin\phi}$$

Therefore, $\dot{\beta}$ can be changed so that $$G(\dot{\beta}) < \frac{\mu\cdot r\cdot M}{M_r\cdot e\cdot\sin\phi}$$

Equation (3)

When Equation (3) holds, the balls are stable with respect to the track 12. The minimum rotation speed that satisfies Equation (3) is called "the unstable critical rotation speed" $w_c$ of the ball. If $\ddot{\beta}$ is 0, then $\dot{\beta}$ can be decreased by looking at Equation (1). Also, as can be seen from Equations (1) and (3), as long as Equation (3) is valid, it is possible to decrease the stable rotation speed of the balls 13 by reducing $\dot{\beta}$.

Figure 5:
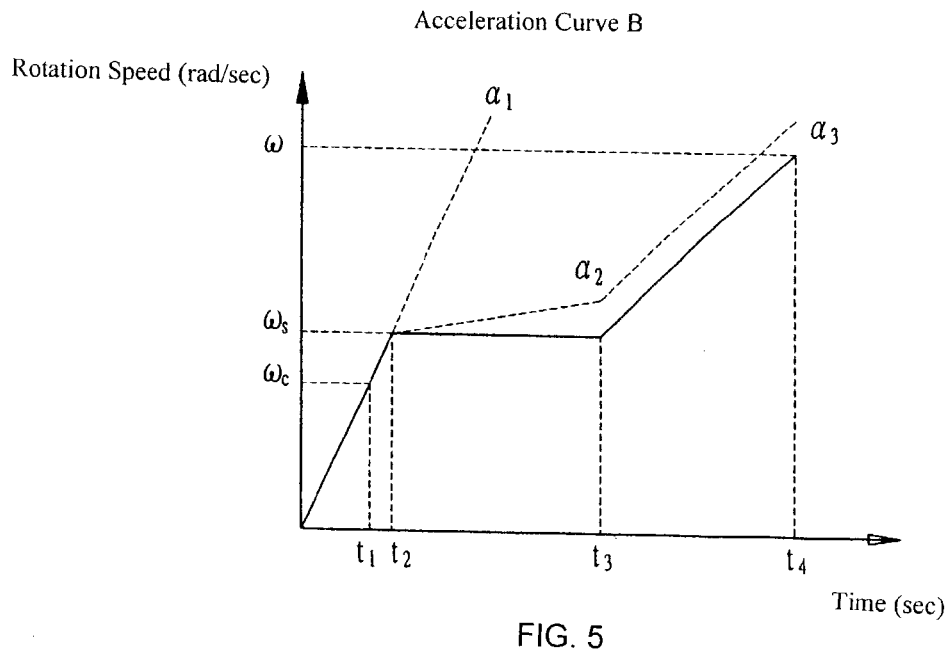
FIG. 5 is a diagram illustrating the acceleration curve of the rotor mechanism used in the present invention.
Figure 6:
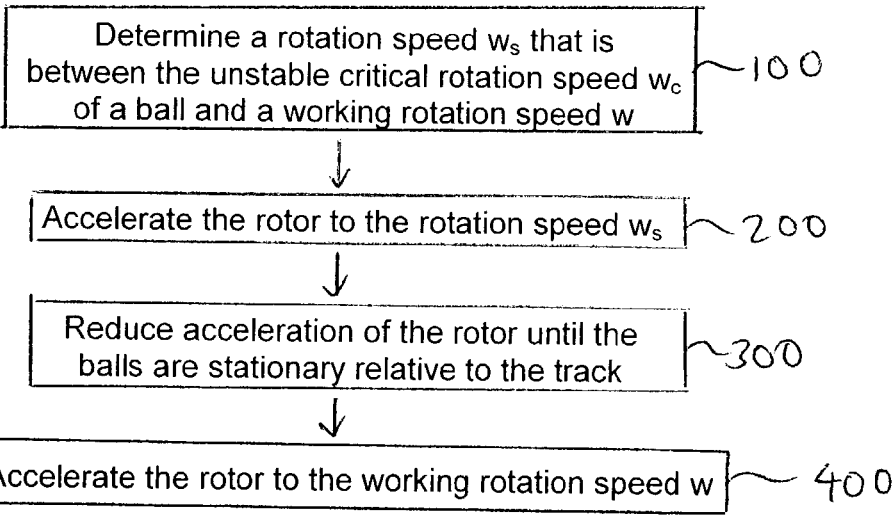
FIG. 6 is a flow chart illustrating the control method of the present invention for reducing the stable rotation speed of the automatic ball balancing system.

Based on the above, the objective of the present invention is to cause the balls 13 of an automatic ball balancing system to be stationary with respect to the track 12 even when the rotor mechanism is accelerated. In other words, the objective is to balance the balls 13 inside the track 12 so that there is no more vibration. FIG. 5 is a diagram illustrating the acceleration curve of the rotor mechanism used in the present invention, and should be reviewed in conjunction with FIG. 6, which is a flow chart illustrating the control method of the present invention for reducing the stable rotation speed of the automatic ball balancing system.

The control method of the present invention has the following steps. In step 100, the method determines a rotation speed $w_s$ that is between the unstable critical rotation speed $w_c$ of a ball 13 and a working rotation speed w (that is, $w_c<w_s<w$). The rotation speed $w_s$ is the desired rotation speed that the present invention would like to obtain. The unstable critical rotation speed $w_c$ of the ball is determined by Equation (3) and is larger than the critical rotation speed $w_n$ (also called the natural frequency of the suspending system) defined by the rotor dynamics. The value of the critical rotation speed $w_n$ is derived from experiments and depends on the characteristics of the system. The working rotation speed w is the maximum rotation speed of the spindle motor 16.

In step 200, the rotor mechanism (spindle motor 16) is accelerated to the rotation speed $w_s$ after passing the unstable critical rotation speed $w_c$ of the ball. See FIG. 5. The acceleration used in this step is the initial acceleration $\alpha_1$, which is higher than the conventional initial acceleration $\alpha_1'$ shown in FIG. 2. At this rotation speed $w_s$ the phase angle difference will be 180 degrees, but the balls 13 rotate at a constant speed with respect to the rotor 11.

In step 300, the acceleration of the rotor mechanism is reduced to allow the balls 13 to reach a stable position (i.e., B", the acceleration, is reduced to 0). When the acceleration is reduced to zero in this step, the rotation speed $w_s$ can be used as the stable rotation speed at which the balls 13 reach the stable position. See FIG. 5. In this stable position, the balls 13 will not experience movement relative to the track 12 (i.e., the balls 13 are balanced). This stable rotation speed $w_s$ is also smaller than the conventional stable rotation speed $w_s'$ shown in FIG. 2. If the acceleration is a very small acceleration $\alpha_2$ (that is, the acceleration is almost zero), FIG. 5 shows that it is also possible to obtain a stable rotation speed close to the rotation speed $w_s$, and this stable rotation speed $w_s$ is still smaller than the conventional stable rotation speed $w_s'$ shown in FIG. 2.

Since there is no longer any imbalance (i.e., the balls 13 do not experience movement relative to the track 12), in the next step, step 400, the rotor mechanism is accelerated again to the working rotation speed w. See FIG. 5. During this acceleration, the balls 13 will not experience movement relative to the track 12. The acceleration $\alpha_3$ used in this step is smaller than the initial acceleration $\alpha_1$ of the spindle motor.

Figure 1A:
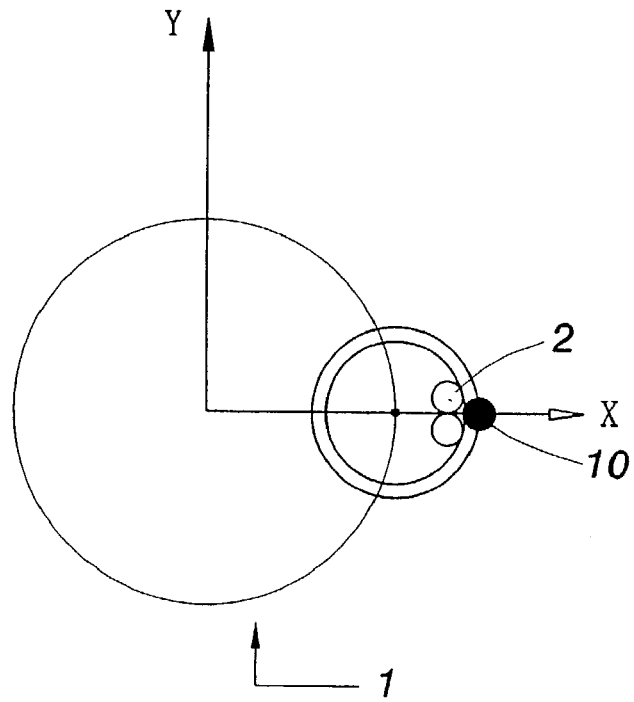
FIGS. 1A–1C illustrate the theoretical relationship between the unbalance amount of a conventional ball-balancing system and the center of mass of the disk as the rotation speed of the spindle motor varies with respect to the natural frequency.
Figure 1B:
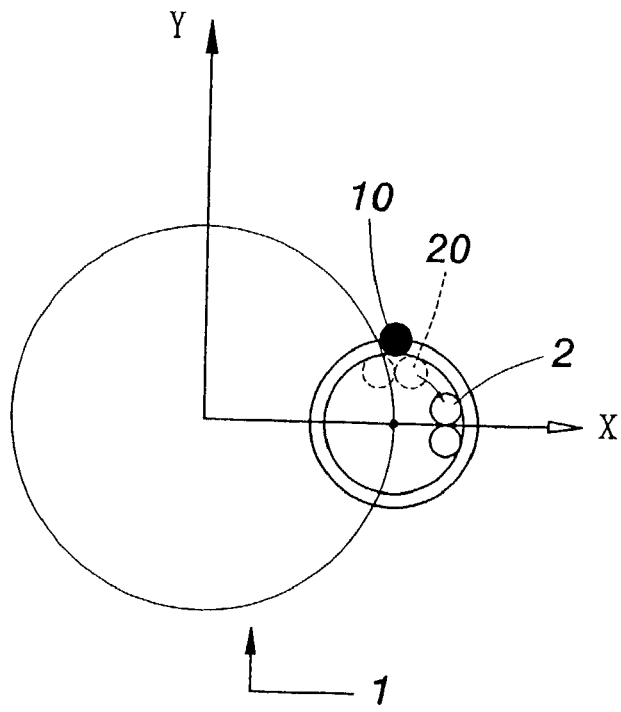
Figure 1C:
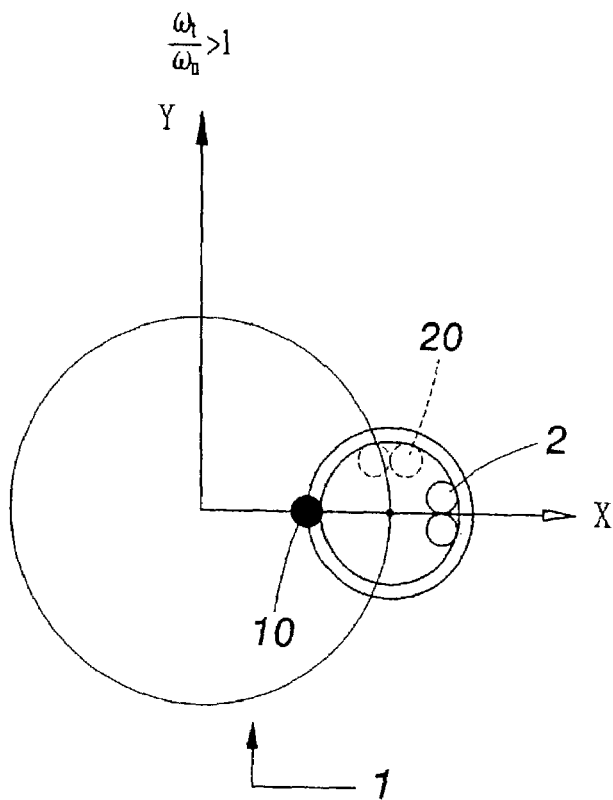
Figure 2:
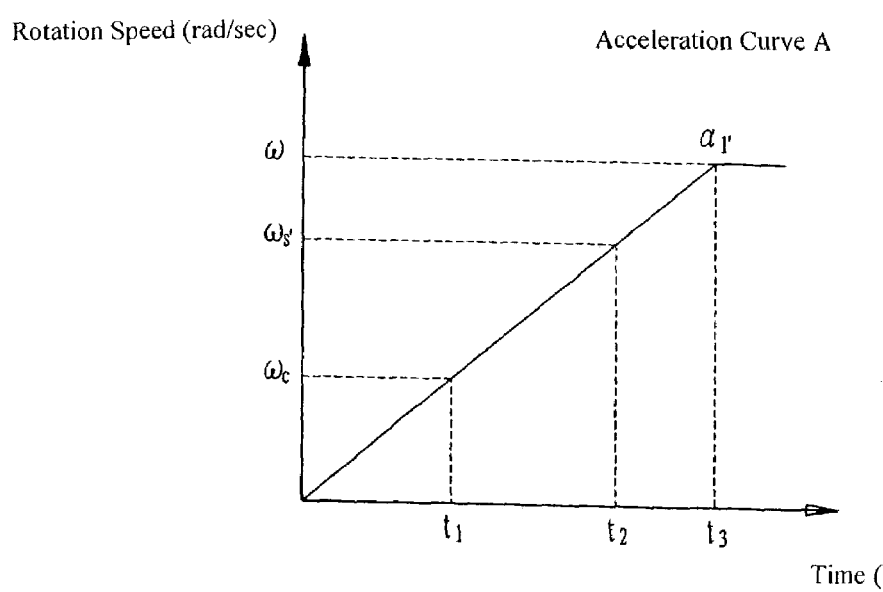
FIG. 2 illustrates the relationship between rotation speed and time for a conventional ball-balancing system.
Figure 7:
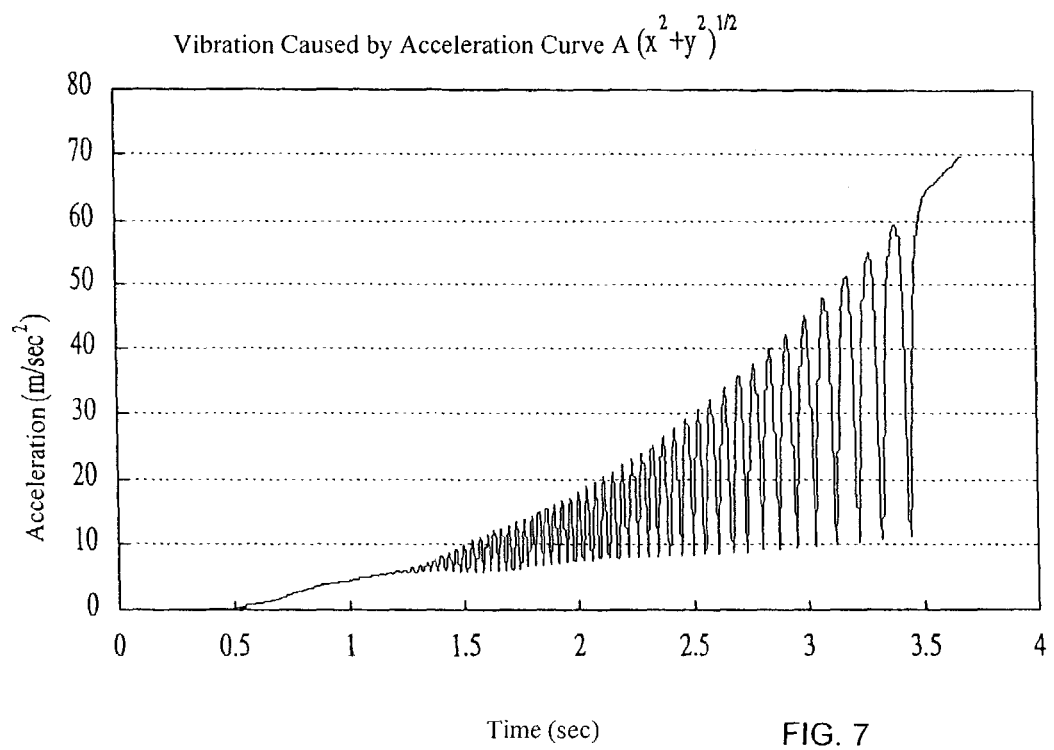
FIGS. 7 and 8 are obtained from simulation experiments of the acceleration curves A and B shown in FIGS. 2 and 5, respectively.
Figure 8:
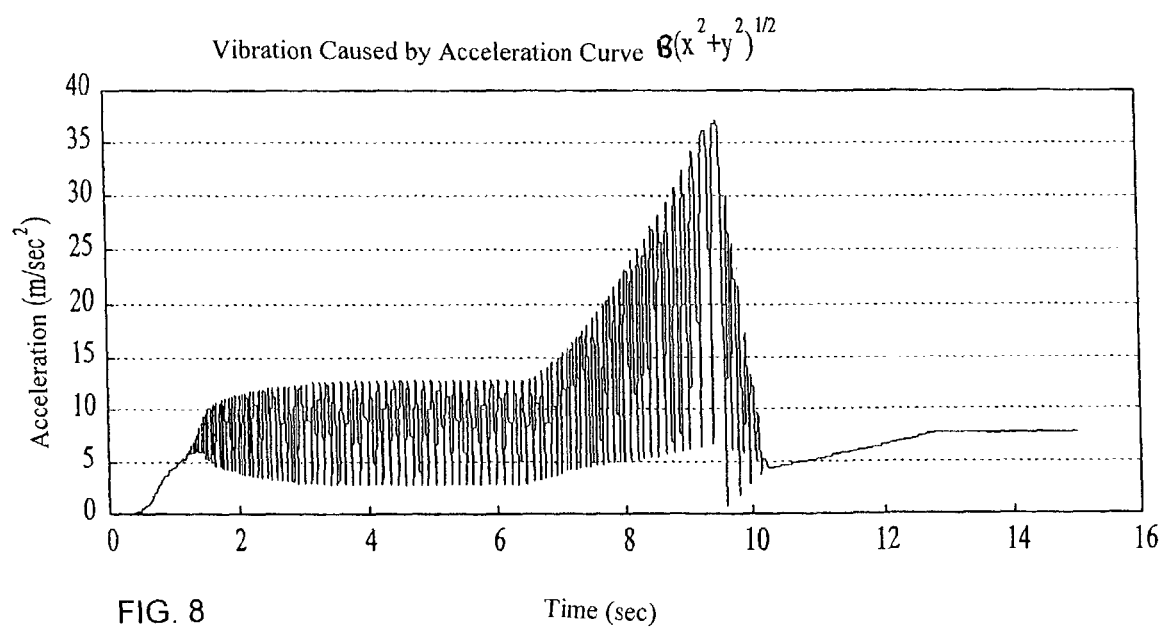

FIGS. 7 and 8 are obtained from simulation experiments of the acceleration curves A and B shown in FIGS. 2 and 5, respectively. As can be seen from FIG. 7, with the conventional acceleration curve A, even at 9,500 rpm, the ball 13 has not reached the balanced position. On the other hand, as shown in FIG. 8, with the acceleration curve of the present invention, the ball 13 reaches the balanced position by 6,600 rpm.

As described above, the present invention provides a new control method that can be applied to single-track or multi-track automatic balancing systems. The present invention provides an effective, stable, and reliable method that can be used to overcome the problems experienced by a conventional automatic ball balancing system. In other words, the method of the present invention can reduce the stable rotation speed at which the balls are balanced so as to correctly read data at high speed and to carry out a smooth operation. More specifically, the control method provided by the present invention for reducing the stable rotation speed of an automatic ball balancing system can effectively reduce the stable rotation speed of the automatic ball balancing system to reduce vibration before the spindle motor reaches the working rotation speed, thereby realizing the objective of effectively improving the service life of the bearing.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of balancing an automatic ball balancing system in an optical disk reading device, the automatic ball balancing system having a rotor that has an annular track, with at least one ball provided for rotation inside the track, the method comprising:
    determining an optimum rotation speed $w_s$ that is between the unstable critical rotation speed $w_c$ of a ball and a working rotation speed w;
    accelerating the rotor at a first acceleration until the rotor reaches the optimum rotation speed $w_s$;
    rotating the rotor at a second acceleration, which is different from the first acceleration, until the balls are stationary relative to the track; and
    accelerating the rotor at a third acceleration until the rotor reaches the working rotation speed w.

2. The method of claim 1, wherein the second acceleration is zero.

3. The method of claim 1, wherein the second acceleration is less than the first acceleration.

4. The method of claim 1, wherein the third acceleration is less than the first acceleration.

5. The method of claim 1, wherein the third acceleration is different from the first and second accelerations.

6. A method of balancing an automatic ball balancing system in an optical disk reading device, the automatic ball balancing system having a rotor that has an annular track, with at least one ball provided for rotation inside the track, the method comprising:
    determining an optimum rotation speed $w_s$ that is between the unstable critical rotation speed $w_c$ of a ball and a working rotation speed w;
    accelerating the rotor at a first acceleration until the rotor reaches the optimum rotation speed $w_s$;
    rotating the rotor at a second acceleration, which is less than the first acceleration, until the balls are stationary relative to the track; and
    accelerating the rotor at a third acceleration until the rotor reaches the working rotation speed w.

7. The method of claim 6, wherein the third acceleration is different from the first and second accelerations.

* * * * *